United States Patent [19]

Piepmeier, Jr. et al.

[11] Patent Number: 4,824,621

[45] Date of Patent: Apr. 25, 1989

[54] METHOD FOR MAKING AN INK-IMPREGNATED MATERIAL

[75] Inventors: Arthur L. Piepmeier, Jr., Cookeville; Charles M. Nunally, Baxter, both of Tenn.

[73] Assignee: Porelon, Inc., Cookeville, Tenn.

[21] Appl. No.: 166,680

[22] Filed: Mar. 11, 1988

Related U.S. Application Data

[62] Division of Ser. No. 7,160, Jan. 26, 1987, Pat. No. 4,768,437.

[51] Int. Cl.[4] ............................ C08J 9/26; C08J 9/28

[52] U.S. Cl. ...................................... 264/41; 101/327; 101/348; 264/49; 428/314.2; 521/51

[58] Field of Search ............................ 264/49; 204/41; 101/327, 348; 428/314.2; 521/51

[56] References Cited

U.S. PATENT DOCUMENTS

| | | | |
|---|---|---|---|
| 3,932,251 | 1/1976 | Tanaka | 264/49 X |
| 3,956,020 | 5/1976 | Weininger et al. | 264/49 X |
| 4,092,456 | 5/1978 | Newman et al. | 264/49 X |
| 4,170,540 | 10/1979 | Lazarz et al. | 264/49 X |
| 4,190,707 | 2/1980 | Doi et al. | 264/49 X |
| 4,226,886 | 10/1980 | Lakes | 264/49 X |
| 4,289,600 | 9/1981 | Lazarz et al. | 264/49 X |
| 4,768,437 | 9/1988 | Piepmeier, Jr. et al. | 101/327 |

*Primary Examiner*—Philip Anderson

*Attorney, Agent, or Firm*—Foley & Lardner

[57] ABSTRACT

A method for making an ink-impregnated material includes steps of mixing from a plastic powder, a water-soluble salt and a water-soluble, polar organic liquid to form a mixture, heating the mixture to a temperature sufficient to melt the plastic and form a cohesive structure, leaching the salt and polar organic liquid from the structure, drying the structure, and impregnating the structure with an ink. The resulting microporous material has an open-celled network of micropores extending therethrough, which micropores have smooth, rounded internal walls free of fibrous projections. An ink roll made of this material is suitable for use in an apparatus for printing coded images such as bar codes.

14 Claims, 2 Drawing Sheets

FIG. 1
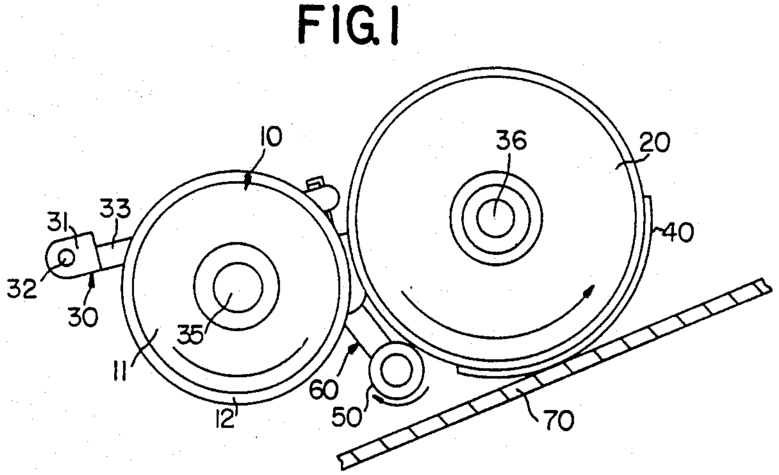
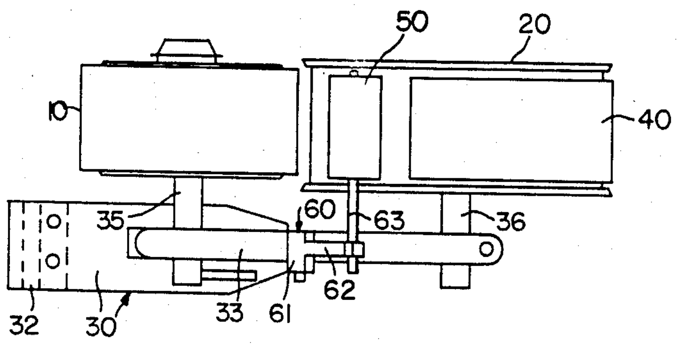
FIG. 2

METHOD FOR MAKING AN INK-IMPREGNATED MATERIAL

This is a division of application Ser. No. 007,160, filed on Jan. 26, 1987, now U.S. Pat. No. 4,768,437, which is a continuation-in-part of Ser. No. 873,080, filed June 3, 1986, now abandoned, which is a continuation of Ser. No. 803,705, filed 12/2/85, now abandoned.

FIELD OF THE INVENTION

This invention relates to an ink-impregnated polymeric material useful for printing images and a method for the manufacture thereof. More particularly, this invention relates to an ink roll usable in a method for printing high contrast, sharp images, such as laser scannable bar codes, and an apparatus for use in such method.

BACKGROUND OF THE INVENTION

Ink rolls having a variety of structures, including microporous structures, have been known for some time. However, known ink rolls are not capable of dispensing a high contrast ink with sufficient sharpness and clarity so that the resulting print can be consistently read using a light scanner, such as a laser scanning device. A laser scanning device only detects sharp images with a high degree of contrast. Known ink rolls leave fuzzy images which cannot be consistently read by a laser scanning device.

The industry in consumer products and other high volume products has been converting to bar codes, such as Interleave 2 of 5, Code 3 of 9, or the Universal Products Code (UPC), for a variety of purposes, including warehousing and inventory control. This has lead to the affixing of bar codes to the outside of shipping cartons. In the past, this has been done by a variety of expensive methods, including pre-printed labels, or cartons preprinted with the appropriate bar code. This, of course, leads to problems with inventory control and adds additional items of inventory for the manufacturer.

Using the ink rollers and methods of the present invention, simple line printing devices can be used to print a laser-scannable code such as a UPC Code on cartons and other packages in a fast and efficient manner. These codes can be printed with a read rate of approaching 99%, i.e., out of 100 prints made, at least 99 are readable by a laser scanning device.

SUMMARY OF THE INVENTION

The present invention is directed to an ink-impregnated material, particularly an ink roll, having a microporous structure for printing a high density image. This material comprises an ink impregnated in a microporous polymeric structure. The ink-impregnated material according to the present invention has a sufficiently low internal surface area so that the ink flows therefrom at a generally constant rate, and a high density image-producing ink can be used therein. Such an ink-impregnated material can be used to print light scannable coded images.

The invention further provides a method for the manufacture of such ink-impregnated materials. Such materials are made by molding a thermoplastic resin in admixture with inorganic salt particles, then leaching away the particles to form an open-celled network of micropores, then impregnating the resulting structure with ink.

This invention also relates to a method of printing light-scannable coded images by transferring a high density image producing ink from an ink impregnated material to a printing surface having a relief pattern corresponding to a light scannable code, and then contacting the inked relief pattern to the surface of an object.

An apparatus for use in such method includes suitable means for performing these functions, particularly a support structure having an ink roll, a roll coater and a smoothing roll rotatably disposed thereon. Ink from the ink roll is transferred to a type face on the roll coater. The smoothing roll smoothes the inked type face, which is then ready for contact with the object to be printed.

BRIEF DESCRIPTION OF THE DRAWING

The invention will now be described below in more detail with reference to the attached drawing wherein like numerals denote like elements, and:

FIG. 1 is a simplified elevation view of an apparatus for printing a light-scannable coded image according to the present invention;

FIG. 2 is a top plan view of the apparatus shown in FIG. 1; and

DETAILED DESCRIPTION OF PREFERRED EXEMPLARY EMBODIMENTS

Figure 3:
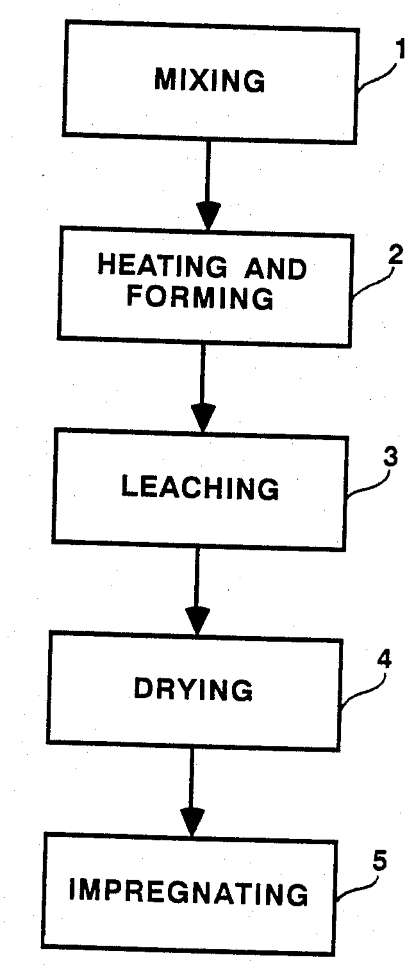
FIG. 3 is a flowchart of a process for making an ink-impregnated material according to the invention.

Referring to FIGS. 1 and 2, an ink roll 10 according to the invention is built into a friction roll coating device which includes a roll coater 20, a support structure 30, a changeable type face 40, and a smoothing roll 50. The roll coating device can be any suitable roll coating device, including those shown in U.S. Pat. Nos. 3,736,870, 3,968,747, and 4,129,074, disclosures of which are incorporated herein by reference. In the method of the present invention, changeable type face (relief pattern) 40 will typically be a bar code or combination of a bar code and numerals to be imprinted on the surface of an object (substrate) 70 to be marked, such as a cardboard carton or the like.

Support structure 30 includes a mounting plate 31 pivotally mounted to the side of an assembly line (not shown) by a hinge 32, a support arm 33 extending therefrom to one side of rolls 10, 20, and 50, and a pair of parallel roll axles 35, 36 perpendicular to arm 33 and connected thereto by suitable means, on which ink roll 10 and roll coater 20 are rotatably mounted, respectively. In use, support 30 is attached to the side of the assembly line such that roll coater 20 contacts the object 70, i.e. cartons or other items to be printed as they move down the line. This causes changeable type face 40 to contact object 70 to print the bar code thereon. Ink roll 10 comprises a support drum 11 and a microporous cylindrical structure 12 mounted thereon. Structure 12 is impregnated with a high density image-producing ink made according to the method as described herein.

After changeable type face 40 contacts the surface of ink roll 10, it then passes over smoothing roll 50 which is attached to support 30 by suitable support means 60. Support means 60 comprises a T-shaped bracket 61 having a stem 62 which extends from arm 33. A smoothing roll axle 63 is rotatably mounted at the end of stem 62 remote from arm 33. Smoothing roll axle 63 is positioned between and parallel to roll axles 35, 36. Roll 50 levels the ink on type face 40, and the cylindrical surface thereof may be made of any type of generally smooth, firm material, such as rubber or aluminum, for holding smoothing roll 50 in light contact with changeable type face 40 to remove excess ink from changeable type face 40 prior to contact with object 70 to receive the image.

By means of smoothing roll 50 and ink roll 10, a sharp clear image can consistently be placed on a surface, even an irregular (rough) surface such as a cardboard carton, such that the image can be read or scanned by a light scanner, particularly a laser scanning device. In order for a laser-scannable image to be considered useful, it must be capable of being scanned with a rejection rate of no more than 1 per 100. Such images may be bar or other codes readable by well known light-type scanners, such as light pens or laser scanners. For purposes of the present invention, the term light scanner includes devices of the general type which operate by scanning the coded image with light, registering differences in light reflected from the image as the image is scanned, and indicating the results. The results may then be interpreted according to the predetermined code. The method of the present invention is particularly advantageous because it prints images sufficiently sharp to be read by laser light, i.e. a laser scanner.

Referring to FIG. 3, ink roll 10 may be prepared by a method including as its initial step (1) mixing from 8 to 50% by weight of a plastic powder with from about 10 to 90% by weight of a water-soluble salt and from about 10 to 50% by weight of a water-soluble, polar organic liquid. This mixing preferably takes place in the absence of external heating, but under vacuum. The purpose of the mixing is to intimately mix the plastic, water-soluble salt and the polar organic liquid. After the mixture is intimately mixed, it is placed in a mold and heated with any of a variety of heating means to a temperature above the melting temperature of the plastic. This allows the plastic to melt and form a cohesive structure around the salt and polar organic liquid. Following this melting step, the structure is allowed to cool, and then the salt and polar organic liquid are leached (step 3) from the structure, preferably with water. The structure is dried (step 4) and then impregnated (step 5) with from about 40 to about 90% by weight of an ink. In the detailed description of this method which follows, amount limitations should be considered approximate.

The first step of the preceding method of forming an ink roll of the present invention comprises mixing from 8 to 50% by weight of the plastic powder with the water-soluble salt and the water-soluble, polar organic liquid. The plastic powder preferably has an average particle size within the range of from 1 to 80 microns. Better results are obtained when the plastic used to form the structure is impervious to solvents typically used in formulating printing inks. Suitable plastics are the thermoplastic polymers such as polyvinyl chloride, polyvinyldene chloride, polystyrene, acrylonitrile-butadiene-styrene polymers, butadiene-styrene polymers, acrylate polymers and copolymers such as ethylacrylate, butylacrylate, etc., polyvinyldiene fluoride, polyethylene, polypropylene, polyethylene vinyl acetate copolymers, polyamides, nylons, polychlorotrifluoroethylene, polyacrylonitrile, alkyl methacrylate polymers, such as polymethyl methacrylate, etc., cellulose acetate, acetals, polycarbonates, and the like. Preferred polymers include polyethylene, polypropylene, polyethylene-vinylacetate copolymers, and mixtures thereof. Although any grade of polyethylene and polypropylene can be used, it is preferred to use high density polyethylene, linear low density polyethylene, mixtures of high density polyethylene with a polyethylene vinylacetate and mixtures of linear low density polyethylene with polyethylene vinylacetate. The preferred amount of plastic powder usable in the method of the present invention is from about 10 to about 25% by weight, based on the total weight of the initial mixture including plastic powder, water-soluble salt and water-soluble, polar organic liquid.

The second ingredient of the mixture is a water-soluble salt. The salt used can be any water-soluble salt which is compatible with the plastic powder to be utilized and the water-soluble, polar organic liquid. Inorganic salts, particularly alkali metal salts, are preferred. Such salts include sodium nitrate, sodium chloride and the like, of which sodium nitrate is preferred. The more water-soluble the salt, the easier it is to remove with the solvent of choice, water. Generally, from about 10 to 90% by weight of the water-soluble salt is used in the initial mixture. The greater the amount of water-soluble salt used, the more open or porous the microporous structure becomes. Generally, it is preferred to use between about 40 and 65% by weight salt, although in certain situations, where a very porous ink roll is required, up to 90% wt. can be utilized.

The third component is a water-soluble, polar organic liquid. As such liquid, an alcohol such as an alkanediol can be used, preferably one having from 2 to 5 carbon atoms. The boiling point of the polar organic liquid must be higher than the metong point of the particular plastic to be used because the polar organic liquid must remain in a liquid state while the plastic is being melted to form the microporous cohesive structure. Suitable alkanediols include propylene glycol, 1,4-butanediol, 1,5-pentanediol and the like. Generally, from 10 to 50% by weight of the water-soluble liquid is used, and preferably from 20 to 40% by weight, based on the total weight of the initial mixture.

The water-soluble, polar organic liquid improves the processing of the microporous structure at room temperature. However, the prime reason for using the water-soluble, polar organic liquid is to enhance the flow characteristics of the high density image-producing ink from the microporous structure which is formed. The water-soluble, polar organic liquid is believed to coat the salt particles and smooth (round) their rough edges. This allows the formation of a microporous structure having a smooth, rounded internal surface which dramatically lowers the internal surface area of the structure. Microporous structures with a high internal surface area act to hold the ink within the structure and the structure may actually filter the pigment out of the ink, a circumstance to be avoided. Thus, proper careful control permits an ease of tailoring appropriate surface characteristics.

The use of the water-soluble, polar organic liquid acts on the molded plastic to form an open-celled structure of interconnected, often spheroidal or avoid cavities with smooth internal surfaces essentially free of fibrous type projections. This structure has a "0" (i.e., zero) order ink loss rate rather than a first order ink loss rate, as is typical of other microporous structures. The practical effect of a "0" order ink loss rate is the structure dispenses substantially the same amount of ink upon repetitive contract with a surface over most of its useful life, i.e. the same amount between 2000–3000 impressions as between 8000–9000 impressions.

A method for making an ink-impregnated, molded material according to the invention is as follows. The plastic powder, salt and water-soluble, polar organic liquid are mixed together in any order to form a thick viscous paste. The mixing step is carried out over a period of at least about 10 minutes. This mixing is to be done without application of heat, but preferably under subatmospheric (e.g., vacuum) or such other conditions so that air is not introduced into the mixture. The thick mixture is then placed in an appropriate mold by pumping, manual transfer or the like. Suitable molds can include roll shaped molds, bar molds, etc. The plastic is then heated. It becomes firm and hard, and is then removed from the mold. After molding and cooling, the salt and liquid are leached out. One method of leaching is to place the structure in water and allow it to stand. Depending upon the temperature and the movement of the water, the salt and water-soluble liquid can be leached out of the structure in as little as one hour. After the water and soluble liquid and salt are removed, a pliable, microporous structure remains. This structure is then dried and the high density image-producing ink, as described in detail below, is impregnated therein.

In one application of the preceding general method, the powdered plastic, water-soluble, polar organic liquid and water-soluble salt are mixed for from 10 to 45 minutes to form an intimate mixture of the components. The mixing also rounds the sharp edges of the salt particles. Mixing can be accomplished by conventional mixing equipment without supplying heat during the mixing step. The resulting material can be easily handled.

After the mixture of plastic, water-soluble liquid and smoothed water-soluble salt particles is formed, it is then transferred by any conventional means to a mold, such as pumping if the mixture is pumpable, or manual transfer. The mold can be of any desired shape. For forming ink rolls, a mold of 4" outside diameter and 2½" inside diameter by 12" in length is suitable.

After the mixture is placed in the mold, the mold and mixture are heated by conventional means, for instance, a hot oil bath, microwave radiation or forced air. The exact temperature depends on the components used. The temperature should be above the melting temperature of the plastic but below the boiling point of the water-soluble, polar organic liquid. For typical mixtures, a temperature within the range of from 170° to 200° F. maintained for 10 to 40 minutes is switchable.

The mold is then allowed to cool and the resulting structure is removed from the mold. The structure is then placed in a solvent, preferably an aqueous solvent such as water, to leach out the water-soluble, polar organic liquid and the water-soluble salt. Any conventional leaching method may be used. One convenient method is to use warm (120°–140° F.) water which is agitated. The structure is left for up to 24 hours, although shorter periods can be used, such as 4 to 8 hours for a structure of smaller size. The water can be changed periodically to decrease the leaching time.

After leaching, the structure is dried by any conventional means, such as a forced air oven. A drying period of 20–24 hours at 120°–140° F. will typically dry the structure and render it ready for inking. The structure is then placed in a container of ink and held below the ink surface. A vacuum is placed on the ink container and the container is subject to suction for a short period of time, e.g. 2–5 minutes. The vacuum is removed and the structure is allowed to absorb ink for a moderate time, e.g. 10–30 minutes. The excess ink is removed from the surface and the structure is ready for use. Occasionally, it may further be desirable to grind the outer surface of the structure to adjust the dimensions of the structure to a desired size. This grinding has no substantial effect on the release rate of the ink from the structure. The exterior surface of the structure thus prepared (with or without grinding) lacks a skin which must be removed, or through which the ink must permeate.

The average pore size of microporous structures according to the invention is at least 10 microns, generally in the range of approximately 10 to 250 microns. Within the 10–250 micron range, individual pore sizes are seldom more than 50 microns larger or smaller than the average pore size. Pores comprise interconnected cavities or cells, generally of spheroidal or ovoid shape, or of other shapes, which are smooth-walled and rounded. Pores smaller than 10 microns are undesirable because particles of pigment in the ink have particle sizes typically up to about 10 microns, and may thus become lodged in a pore and clog it. Inks preferable for use in the invention have an average pigment particle size of less than about 5 microns, particularly less than about 3 microns, for this reason. As referred to herein, pore and particle sizes refer to the diameter thereof, or to the largest dimension thereof if not spheriodal.

The polymeric structure used in the present invention, e.g. ink roll 10, may also comprise a recticulated polymeric foam material such as the form described in Meisel U.S. Pat. No. 3,297,803, issued Jan. 10, 1967, the entire contents of which are hereby incorporated by reference and relied upon. However, reticulated foams can be difficult to prepare and expensive. The preferred polymeric structure according to the invention has an open-celled structure and is prepared by the salt leaching process described above.

The high density image-producing ink used in the print rolls of the present invention should constitute 40 to 90% of the total weight of the roll. The preferred ink content of the roll is from 60 to 80% by weight. The inks can be formed from either pigment dispersions or dye solutions. If the ink is formed from a dye, the ink should contain 5 to 45% by weight solvent, 5 to 30% by weight of a dye, 5 to 60% by weight of a vehicle, 1 to 40% by weight of a diluent and up to 10% by weight of other additives. Inks formed from pigment dispersions are similar except the solvent and dye are replaced with 5 to 60% by weight of a pigment dispersion.

The dye or pigment should provide a high contrast print on a variety of surfaces. Suitable pigment dispersions include those known in the trade as mineral oil-based black, Black Shield 4585, Orange Dispersion BS-9352, Red Dispersion 10656, and Yellow Pigment 10978, White Dispersion TI 10807, Black Dispersion 10052. Suitable dyes include those known as Methyl Violet X Concentrate, Sol Red 68, Neozapon Red 346, Calcozine Chrysoidine Y, Victoria Blue Base, and Spirit Nigrosine JBDS-3081, Basic Black DS-2481, Calco Nigrosine Base BPS, Spirit nigrosine SB P.S. 3043, Nigrosine Base GBA. Suitable solvents for the dyes include 1,4-butanediol, 1,5-pentanediol, oleic acid, propylene glycol, and mineral oil.

The vehicles used are typical of those used in the printing industry. This vehicle helps to carry the ink in a smooth liquid and helps the ink to stay fresh over the use of the ink roll. Suitable vehicles include castor oil, glycerol monoricinoleate, pentaerythritol monoricinoleate, and ricinoleic diethanolamide.

Diluents reduce the viscosity for a specific use. Suitable diluents include butyl Cellosolve oleate, oleic acid, linoleic acid, Isopars (isoparafinic hydrocarbons from Exxon Chemical), mineral oil, and Sunpar LS-720.

The ink can also include common ink additives. Suitable additives include agents which enhance flow and travel of the ink out of the substrate. Fluorocarbons such as the Fluorads from the 3M Company, fatty acid alkanolamides, such as Clindrol 200RS, methyl salicilate, and other surfactants, and wetting agents, such as the Tamols from Rohm and Haas, can be used.

Inks useful in the present invention form dark images which have a reflectance of not more than about 30%, typically 10% to 30%. For a light scannable coded image, the reflectance of the image ($R_D$) and the reflectance of the background, i.e. the surface proximate the image, ($R_L$) must satisfy a print contrast signal (PCS) relationship as follows:

$$R = 100^* \frac{(R_L - R_D)}{R_L}$$

wherein R is at least about 75% for satisfactory laser scanning. For images printed according to the method of the present invention, values of R frequently exceed 85% or even 90%.

The ink roll and method of forming the same will now be described by the following example, which is for the purpose of illustration and is not in any way to be construed as limiting.

EXAMPLE

To a Ross Interplanatary mixer is added 60.0 pounds of sodium nitrate, particle size 50–150 microns, 15.0 pounds of FE-532 Microthene plastic powder, 10–80 microns, 90% Ethylene/10% vinylacetate copolymer from USI Chemical, and 20.0 pounds of 1,4-butanediol. The above is mixed at low speed under vacuum for 10 minutes. At that time, an additional 5.0 pounds of 1,4-butanediol is added and the mixture is mixed at high speed for 15 minutes under vacuum. The resulting slurry is removed from the mixer and pumped to an aluminum mold. The mold is a cylinder having a core and end caps.

The mold forms a part having a 4" outside diameter and a 2.5 inch inside diameter by 12 inches long. The mold is sealed and placed in a hot oil bath at 280° F. for 20 minutes. After heating, the mold is removed and placed in water for 15 to 20 minutes to cool. The part is then removed from the mold and placed in agitated warm (120°–140° F.) water. After 1 hour, the water is changed and the part is left to soak for an added 6 hours. The part is removed from the water and dried in a forced air oven at 120–140° F. for 24 hours. After removal from the oven, the part is a soft microporous structure ready to be inked.

An ink is then prepared by blending the following materials:

| Ingredient: | Percent by Weight: |
|---|---|
| Mineral Oil Base Black | 30% |
| Blue Pigment Dispersion (BS-10304) | 24% |
| AA Standard Castor Oil (Rincinus Oil) | 24% |
| Ethylene Glycol Monobutylether Acetate | 20% |
| Tamol 731 (Rohm & Haas Proprietary Surfactant 25% Solids) | 2% |

Mineral Oil Base Black is a carbon black pigment in a mineral oil base from Kerley Ink. Blue Pigment Dispersion BS-10304 is a Black Shield blue pigment dispersion in a castor oil base from Carbon Dispersions, Inc.

The above ink is placed in a container and the part having a microporous structure is submerged in the ink. A vacuum is applied to the container for 3 minutes and then released. The part is allowed to soak in the ink for 20 minutes. The part is then removed, and the excess ink is removed. The part is cut to length, typically 3 to 4 inches, and is ready for use. Ink rolls made according to the preceding procedure have a 0 order ink loss rate and provide a laser scannable impression for more than 50,000 impressions.

It will be understood that the above description is of preferred exemplary embodiments of the invention, and that the invention is not limited to the specific forms shown. Modifications may be made in the design and arrangement of the elements without departing from the scope of the present invention as expressed in the appended claims.

We claim:

1. A method for making an ink-impregnated material, comprising:

mixing from about 8 to about 50% by weight of a thermoplastic resin powder with about 10 to about 90% by weight of a water-soluble salt and about 10 to about 50% by weight of a water-soluble, $C_2$–$C_5$ alkanediol to form a mixture;

heating said mixture in a mold to a temperature sufficient to melt said plastic and form a cohesive structure conforming to said mold;

leaching said salt and said polar organic liquid from said structure;

drying said structure; and impregnating said structure with from about 40 to about 90% by weight of an ink.

2. The method of claim 1, wherein said thermoplastic resin powder is selected from the group consisting of polyethylene, polypropylene, polyethylene vinylacetate copolymers and mixtures thereof, and, in said mixing step, said plastic powder has an average particle size before mixing in the range of from about 1 to about 80 microns, and said water-soluble salt is selected from the group consisting of sodium nitrate, sodium chloride and mixtures thereof.

3. The method of claim 1, wherein said leached structure has an average pore size of at least about 10 microns, and said ink consists essentially of a pigment dispersion containing pigment particles having an average particle size of less than about 5 microns.

4. The method of claim 1, wherein said mixture formed in said mixing step consists essentially of about 10 to 25 wt. % of said powder, 40 to 65 wt. % of said salt, and 20 to 40 wt. % of said alkanediol.

5. The method of claim 1, wherein said mixing step is carried out in the absence of heating and under vacuum, and said leaching step further comprises contacting said cohesive structure with water.

6. The method of claim 3, wherein said structure has an average pore size in the range of from about 10 to about 250 microns.

7. A method for making an ink-impregnated material, comprising:

forming a mixture consisting essentially of a thermoplastic resin powder, a water-soluble salt and a water-soluble, polar organic liquid;

heating said mixture to a temperature sufficient to melt said plastic;

forming said mixture into a cohesive structure;

leaching said salt and said polar organic liquid from said structure under conditions effective to form an open-celled network of micropores in said structure, said micropores having smooth, rounded internal walls essentially free of fibrous projections, and having an outer surface which is substantially skin free; and impregnating said structure with from about 40 to about 90% by weight of an ink, said ink being disposed in said micropores and being repetitively transferable to a surface brought in contact with said material, the rate of loss of said ink from said structure being of zero order.

8. The method of claim 7, wherein said forming step comprises molding said structure in a mold.

9. A method for making an ink-impregnated material, comprising:

mixing for at least about 10 minutes, under vacuum and in the absence of external heating, a thermoplastic resin powder selected from the group consisting of polyethylene, polypropylene, polyethylene vinylacetate copolymers and mixtures thereof and having an average particle size before mixing in the range of from about 1 to about 80 microns, with a water-soluble alkali metal salt and a water-soluble, $C_2$–$C_5$ alkanediol to form a mixture consisting essentially of about 10 to 25 wt. % of said powder, 40 to 65 wt. % of said salt, and 20 to 40 wt. % of said alkanediol;

heating said mixture to a temperature sufficient to melt said plastic;

forming said mixture into a cohesive structure;

leaching said salt and said alkanediol from said structure to form an open-celled network of micropores in said structure, said micropores having smooth, rounded internal walls essentially free of fibrous projections;

drying said structure; and impregnating said structure with from about 40 to about 90% by weight of an ink, said ink being disposed in said micropores and being repetitively transferable to a surface brought in contact with said material, the rate of loss of said ink from said structure being of zero order.

10. The method of claim 9, wherein said water-soluble salt is selected from the group consisting of sodium nitrate, sodium chloride and mixtures thereof.

11. The method of claim 9, wherein said leaching step further comprises contacting said cohesive structure with water.

12. The method of claim 9, wherein said alkanediol is 1,4-butanediol.

13. The method of claim 13, said salt is sodium chloride.

14. The method of claim 9, wherein said leached structure has an average pore size of at least about 10 microns, and said ink consists essentially of 5 to 60 wt. % of a pigment dispersion containing pigment particles having an average particle size of less than about 5 microns, 5 to 60 wt. % of a vehicle, 1 to 40 wt. % of a diluent, and up to 10 wt. % of other additives.

* * * * *